United States Patent
Li et al.

(10) Patent No.: US 10,886,721 B2
(45) Date of Patent: Jan. 5, 2021

(54) WIRING COVER ASSEMBLY AND COMPRESSOR

(71) Applicant: SHANGHAI HIGHLY ELECTRICAL APPLIANCES CO., LTD., Shanghai (CN)

(72) Inventors: Jie Li, Shanghai (CN); Youwei Zhang, Shanghai (CN); Zhimin Huang, Shanghai (CN); Zhaodi Fan, Shanghai (CN); Hongsheng Le, Shanghai (CN)

(73) Assignee: SHANGHAI HIGHLY ELECTRICAL APPLIANCES CO., LTD., Shanghai (CN)

( * ) Notice: Subject to any disclaimer, the term of this patent is extended or adjusted under 35 U.S.C. 154(b) by 0 days.

(21) Appl. No.: 16/626,850

(22) PCT Filed: Mar. 28, 2018

(86) PCT No.: PCT/CN2018/080814
§ 371 (c)(1),
(2) Date: Dec. 26, 2019

(87) PCT Pub. No.: WO2019/001041
PCT Pub. Date: Jan. 3, 2019

(65) Prior Publication Data
US 2020/0227906 A1     Jul. 16, 2020

(30) Foreign Application Priority Data

Jun. 27, 2017 (CN) .................. 2017 2 0757737 U

(51) Int. Cl.
*H02G 15/04* (2006.01)
*H02G 15/16* (2006.01)
*H02G 15/06* (2006.01)

(52) U.S. Cl.
CPC ............. *H02G 15/04* (2013.01); *H02G 15/06* (2013.01)

(58) Field of Classification Search
CPC ............................... H02G 15/04; H02G 15/06
USPC ......................................................... 174/77 R
See application file for complete search history.

(56) References Cited

U.S. PATENT DOCUMENTS

| 1,727,590 | A | * | 9/1929 | Ferry | ....................... F16B 37/14 |
| | | | | | 411/430 |
| 2,005,007 | A | * | 6/1935 | Sandler | ................ A43C 11/004 |
| | | | | | 36/58.5 |
| 2,513,577 | A | * | 7/1950 | Malme | ................... A23C 3/031 |
| | | | | | 366/256 |
| 2,655,638 | A | * | 10/1953 | Allen | ................... H01R 13/523 |
| | | | | | 439/271 |

(Continued)

FOREIGN PATENT DOCUMENTS

| CN | 1862153 A | 11/2006 |
| CN | 102903550 A | 1/2013 |

(Continued)

OTHER PUBLICATIONS

The ISR issued Jul. 4, 2018 by the WIPO.

*Primary Examiner* — Timothy J Thompson
*Assistant Examiner* — Michael F McAllister
(74) *Attorney, Agent, or Firm* — Yunling Ren

(57) ABSTRACT

A wiring cover assembly comprises a gasket, a fasten assembly, and a housing. The fasten assembly is used to press the housing on the gasket to form a closed space.

9 Claims, 4 Drawing Sheets

(56) References Cited

U.S. PATENT DOCUMENTS

| | | | | |
|---|---|---|---|---|
| 2,662,206 A * | 12/1953 | Schaefer | ................ | H02K 5/132 |
| | | | | 318/482 |
| 4,250,348 A * | 2/1981 | Kitagawa | ............... | H02G 3/065 |
| | | | | 174/652 |
| 5,362,258 A * | 11/1994 | Arnswald | ............ | H01R 13/521 |
| | | | | 439/271 |
| 5,405,172 A * | 4/1995 | Mullen, Jr. | ................ | F16L 5/06 |
| | | | | 174/652 |
| 6,754,430 B1 * | 6/2004 | Kuehne | ................ | G02B 6/3816 |
| | | | | 174/152 G |
| 7,624,990 B2 * | 12/2009 | Scholer | .................... | C09D 5/34 |
| | | | | 277/314 |
| 9,553,398 B2 * | 1/2017 | True | ......................... | H02G 3/22 |
| 9,784,261 B2 * | 10/2017 | Hagita | .................... | F04B 39/14 |
| 2005/0074354 A1 * | 4/2005 | Ebara | .................... | F04C 23/008 |
| | | | | 417/572 |
| 2008/0192413 A1 * | 8/2008 | Reid | ....................... | H05K 5/061 |
| | | | | 361/679.01 |
| 2014/0065000 A1 * | 3/2014 | Tolbert, Jr. | ........... | H02G 15/013 |
| | | | | 418/55.4 |

FOREIGN PATENT DOCUMENTS

| | | | |
|---|---|---|---|
| CN | 205105026 U | | 3/2016 |
| JP | 10284852 | * | 3/1998 |
| JP | 2002005019 A | | 1/2002 |

\* cited by examiner

WIRING COVER ASSEMBLY AND COMPRESSOR

CROSS-REFERENCE TO RELATED APPLICATIONS

This application is a continuing application of International Application No. PCT/CN2018/080814, filed Mar. 28, 2018, which is based upon and claims priority to Chinese Patent Application No. 201720757737.7, filed Jun. 27, 2017, the entire contents of which are incorporated herein by reference.

TECHNICAL FIELD

The present disclosure generally relates to the fields of a compressor, and more particularly, to a wiring cover assembly and a compressor.

BACKGROUND

Recently, with the development of society and the increasing popularity of vehicles, the requirements of waterproof performance of the vehicle rolling-rotor compressors also become stricter. In the current vehicle compressor, a wiring cover is usually installed at the wiring portion for collapsing wires and protecting wires. The conventional wiring cover assembly of the compressor usually includes wiring cover and the sealed wiring terminal. The structure of this assembly has lots of defects. For example:

(1) When the vehicles is running or riding, the body of the vehicle is shacking. Considering the operation environment of the vehicle compressor, if the compressor only has connection of the cover and the sealed wiring terminal, the compressor will shack with the vehicle. The conventional wiring cover is extremely prone to drop and slack and has poor firmness and tightness. The connection of the cover itself is loose, and the waterproof performance is lowered.

(2) The conventional wiring cover of the compressor is usually in the form of a metal box cover when it is waterproofed. At the same time, a paint leakage hole, located at the bottom of the metal box cover, reduces tightness of the compressor and cannot fully meet the waterproof requirements.

Therefore, those skilled in the art are committed to developing a wiring cover assembly and a compressor that can achieve a better waterproof performance.

SUMMARY

In view of the problems of the current technology, the object of the present disclosure is providing a wiring cover assembly and a housing of the cover is pressed, by a fasten assembly, on a gasket to form a closed space. The gasket includes bosses or humps. The bosses or the humps are interference fit on an internal wall of an end of the housing. Moreover, in order to solve the problems described in background section, the wiring cover assembly further includes a cover plate and waterproof nuts to reaching the grade of waterproof for IP67. Accordingly, the present invention provides a wiring cover assembly, in accordance with claims which follow.

In the present disclosure, there is provided a wiring cover assembly comprising a gasket, a fasten assembly, and a housing. The fasten assembly is used to press the housing on the gasket to form a closed space.

In the present disclosure, there is provided a compressor, comprising a housing, an upper cover and a lower cover. A wiring cover assembly is disposed on the upper cover and/or the lower cover. The wiring cover assembly includes a gasket, a fasten assembly, and a housing. The housing includes a wire outlet used to lead lead-out wires out of a compressor and the wire outlet includes a waterproof connector.

DETAILED DESCRIPTION

Figure 1:
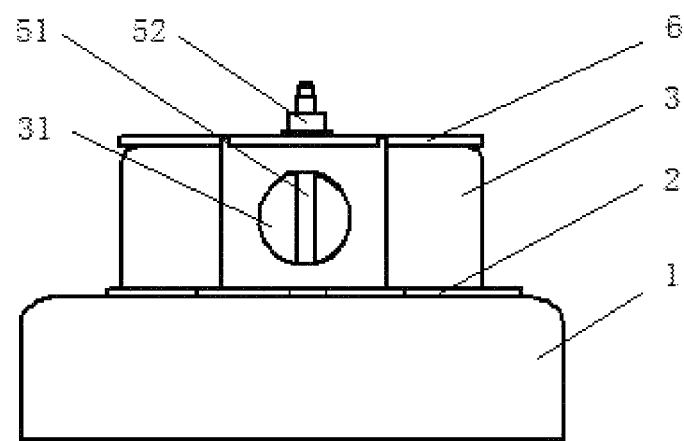
FIG. 1 is a front view of a wiring cover assembly used by a compressor of one embodiment of the present disclosure.
Figure 2:
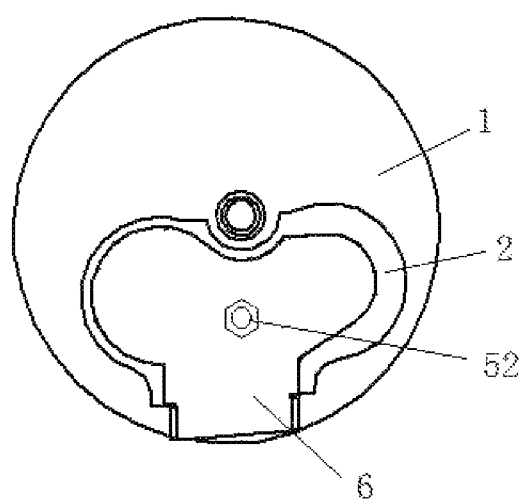
FIG. 2 is a top view of the wiring cover assembly of FIG. 1.

As shown in FIGS. 1 and 2, in the present disclosure, a compressor includes a compressor housing (not shown), an upper cover 1 and a lower cover (not shown). The upper cover 1 includes a wiring cover assembly.

The wiring cover assembly is used to improve the sealing grade of the wiring portion of the compressor. The wiring cover assembly includes a gasket 2 and a housing 3. The housing 3 includes a wire outlet which is used for leading lead-out wires out of the compressor. The wire outlet includes a waterproof connector 31.

The wiring cover assembly further includes a fasten assembly. The fasten assembly includes a screw 51 and a nut 52. The housing 3 is tightly pressed, by the fasten assembly, on the gasket 2 to form a closed space.

Figure 3:
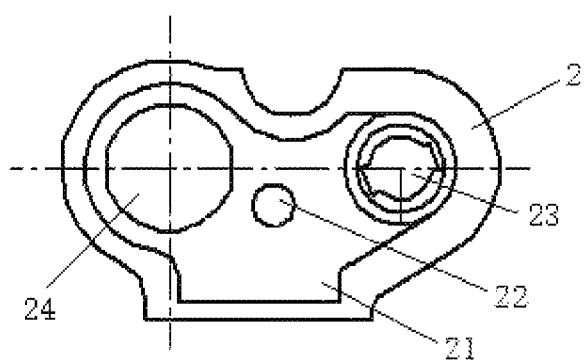
FIG. 3 is a top view of a gasket of the wiring cover assembly of FIG. 1.

The gasket 2 includes a rubber gasket. As shown in FIG. 3, the gasket 2 includes a boss 21. The raised outer edge is formed a closed curve which is interference fit to an inner wall of the housing 3. The waterproof performance of the wiring cover assembly is then further improved. The gasket 2 includes a central through-hole 22 used for fastening the gasket. The gasket 2 also includes two through-holes 23, 24. One through-hole 23 of the other two through-holes is used for installing a temperature actuated switch. Another through-hole 24 is used for sealing a wiring terminal. The sealed wiring terminal is used to couple electric wires of the electric source to make the compressor work.

Figure 4:
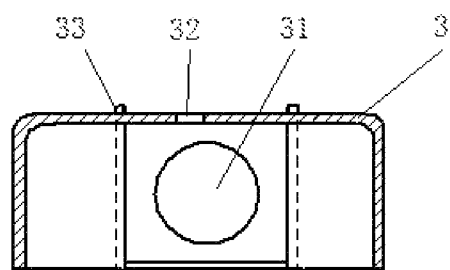
FIG. 4 is a cross-sectional view of a housing of the wiring cover assembly of FIG. 1.

As shown in FIGS. 3 and 4, the top of the housing 3 includes a through-hole 32 used to fasten the housing 3. The wire outlet located on a side wall of the housing 3 includes a waterproof connector 31 which is used for leading lead-out wires out of the compressor.

The screw 51 goes through the through-hole 32 of the housing 3 and the through-hole 22 of the gasket 2. The housing 3 is then fastened on the cover 1 by a nut 52. The nut 52 includes a cap nut which will further improve the waterproof performance of the wiring cover assembly. The waterproof connector 31 includes a round connector which is capable of coupling to other standard tubes for implementing waterproof. After the lead-out wires are assembled, the waterproof connector 31 is then sealed by thread sealant to seal the thread inside the waterproof connector 21.

In another embodiment, in order to ensure the housing 3 is evenly and tightly pressed on the gasket 2, the wiring cover assembly further includes a cover plate 6 disposed on the housing 3. As shown in FIG. 1, specifically, the housing 3 is made of thinner material.

The top of the housing 3 further includes humps 33, as shown in FIG. 4, which is used to fasten the cover plate 6. The screw 51 goes through the through-hole of the cover plate 6, the through-hole 32 of the top of the housing 3, the through-hole 22 of the gasket 2. The housing is then fixed on the upper cover 1 by the nut 52.

In this embodiment, the cover plate 6 is made of metal, and also can be made of plastic or other materials.

In practical production, it is difficult to assure the flatness of the housing 3 and the cover plate 6. Therefore, a rubber gasket is disposed between the housing 3 and the cover plate 6 to further improve the grade of waterproof of wiring cover assembly.

A rubber gasket is also disposed between the cover plate 6 and the nut 52 to further improve the grade of waterproof of the wiring cover assembly.

In this embodiment, the wiring cover assembly adopts the above structure and the grade of waterproof reaches IP67.

The preferred embodiments of the present disclosure have been described in detail above. It should be understood that those skilled in the art can make many modifications and changes according to the concept of the present disclosure without creative work. Therefore, any technical solution that can be obtained by a person who skilled in art through logical analysis, reasoning, or limited experimentation based on the concept of the present disclosure on the basis of the prior art shall fall within the protection scope determined by the claims.

The invention claimed is:

1. A wiring cover assembly, comprising:
a gasket;
a fasten assembly, the fasten assembly includes a screw and a nut; and
a housing;
wherein the fasten assembly is used to press the housing on the gasket to form a closed space; the fasten assembly further includes a cover plate disposed on the top of the housing; the top of the housing further includes humps used to fasten the cover plate.

2. The wiring cover assembly of claim 1, wherein the gasket includes bosses or humps.

3. The wiring cover assembly of claim 1, wherein the housing includes a wire outlet used to lead lead-out wires out of a compressor, wherein the wire outlet includes a waterproof connector.

4. The wiring cover assembly of claim 3, wherein the waterproof connector includes a round connector.

5. The wiring cover assembly of claim 3, wherein the waterproof connector is sealed by thread sealant to seal the thread inside the waterproof connector.

6. The wiring cover assembly of claim 1, wherein the nut includes a cap nut.

7. The wiring cover assembly of claim 1, wherein a rubber gasket is disposed between the fasten assembly and the cover plate and/or the rubber gasket is disposed between the cover plate and the housing.

8. A compressor, comprising:
a housing;
an upper cover; and
a lower cover;
wherein a wiring cover assembly is disposed on the upper cover and/or the lower cover;
wherein the wiring cover assembly further comprises:
a gasket;
a fasten assembly, wherein the fasten assembly includes a screw and a nut, the fasten assembly is used to press the housing on the gasket to form a closed space; the fasten assembly further includes a cover plate disposed on the top of the housing, the top of the housing further includes humps used to fasten the cover plate.

9. The wiring cover assembly of claim 1, wherein the top surface of the housing is a flat surface.

* * * * *